United States Patent [19]

Stripling et al.

[11] 3,941,345

[45] Mar. 2, 1976

[54] RADIAL ARM GUIDANCE PLATFORM TRACKER

[75] Inventors: William W. Stripling; Harold V. White; Joe S. Hunter, all of Huntsville, Ala.

[73] Assignee: The United States of America as represented by the Secretary of the Army, Washington, D.C.

[22] Filed: Nov. 28, 1973

[21] Appl. No.: 419,826

[52] U.S. Cl. .................................. 244/3.1; 73/1 E
[51] Int. Cl.² ....................................... G01C 25/00
[58] Field of Search ............... 244/3.1, 3.16; 73/1 E; 356/138, 149

[56] References Cited
UNITED STATES PATENTS 3,797,782   3/1974   Stripling et al. ................... 244/3.16

Primary Examiner—Verlin R. Pendegrass
Attorney, Agent, or Firm—Nathan Edelberg; Robert P. Gibson; James T. Deaton

[57] ABSTRACT

A radial arm tracker with a constant drive ratio for use in monitoring the position of a guidance platform during the firing azimuth alignment phase. One end of the radial arm is mounted to the rotor of an encoder and a telescope is pivotally mounted at the free end of the radial arm through a constant ratio drive system to a stator of an encoder. The stator of the encoder is coupled to a north seeking device. The missile firing azimuth is referenced to the output of the north seeking device through the radial arm tracker.

2 Claims, 2 Drawing Figures

RADIAL ARM GUIDANCE PLATFORM TRACKER

CROSS REFERENCE TO RELATED APPLICATION

This application is related to applicants' co-pending application Ser. No. 328,796, filed February 1, 1973, and now U.S. Pat. No. 3,797,782.

BACKGROUND OF THE INVENTION

This invention is in the field of azimuth reference alignment systems. Such systems may be used effectively on any system which utilizes a guidance platform for establishing a firing direction azimuth. Known systems which are in present use require at least two theodolites (one of which is translated along a lathe bed tripod) plus pre-survey information. One such system requires that a third order survey line be established. A surveyor's target is emplaced over a stake at one end of the line and an orienting station theodolite (OST) at the other end of the line. The theodolite is aligned on the target and the pre-survey azimuth number is set into the theodolite scale. The OST is then used to align the horizontal laying theodolite (HLT). The OST and HLT instruments are aligned on each other and the OST operator tells the HLT operator the number to set into his theodolite scale. The HLT instrument is then used to align the missile guidance platform. The firing azimuth is determined during the countdown by a programmer test station (PTS) computer. The firing azimuth is transmitted from the PTS operator to the HLT operator. The HLT operator turns his theodolite to firing azimuth (actually 90° to firing azimuth because he is looking onto the side of the platform). The HLT operator then uses his control to align the guidance platform on firing azimuth. The HLT is manually translated along the lathe bed tripod to maintain acquisition of the guidance platform during the azimuth alignment process.

Therefore, it is an object of this invention to overcome many of the problems associated with other systems by providing a radial arm tracker that has a telescope mounted thereon and is driven by a constant ratio drive for tracking the position of the platform within a missile.

Another object of this invention is to provide a means which offers even greater benefits when used in conjunction with a north seeking device by eliminating the requirement to translate the north seeking device along a lathe bed tripod.

SUMMARY OF THE INVENTION

In accordance with this invention, a radial arm tracker with a constant ratio drive is used in monitoring the position of a guidance platform during the azimuth alignment phase. One end of a radial arm is attached to a rotor of an encoder and turns with the rotor about the encoder pivot axis (angular measuring axis). A telescope is rotatably mounted at the free end of the radial arm. A constant ratio drive system interconnects the means pivotally mounting the telescope and a stator of the encoder. The constant ratio drive system enables the telescope to track the platform position during alignment along the firing azimuth.

DESCRIPTION OF THE PREFERRED EMBODIMENT

Figures 1, 2:
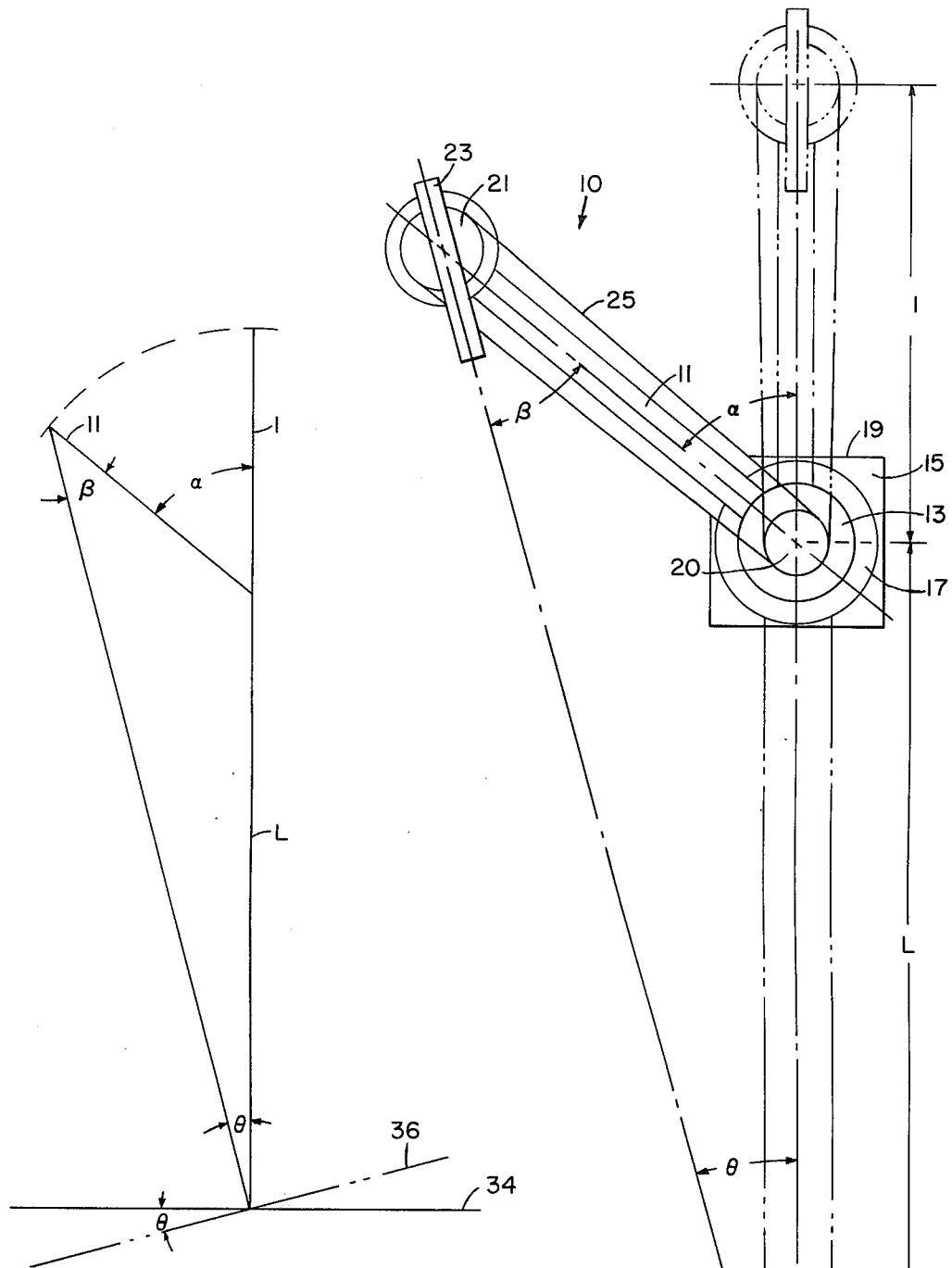
FIG. 1 is a view of a radial arm tracker according to this invention.
FIG. 2 is a graphic illustration of azimuth alignment.

Referring now to FIG. 1, a radial arm tracker 10 according to this invention is disclosed that is to be used in a system of the type disclosed in applicants' co-pending application Ser. No. 328,796, filed February 1, 1973. The radial arm tracker according to this invention is used in the same manner as that disclosed in applicants' co-pending application except that this radial arm device has a constant ratio drive system. The radial arm tracker includes an arm 11 that is attached at one end to rotor 13 of encoder 15. Stator 17 of encoder 15 is coupled to a north seeking device 19 via servo follow-up system (not shown) and integrally to pulley 20. Pulley 21 is pivotally mounted on the other or free end of arm 11 and telescope 23 is integrally secured to pulley 21. Pulley 21 is rotated relative to arm 11 by belt 25. Pulleys 20 and 21 with belt 25 constitute a constant ratio drive system. Even though pulleys and a belt are illustrated for the constant ratio drive system, constant ratio gear means may be substituted for the pulleys and belt.

The tracker is mechanized to follow the equation $$\beta = \alpha - \theta$$

where $\beta$ is the angle between arm 11 and the telescope sighting axis, $\alpha$ is the angle through which arm 11 has turned from a known reference position as illustrated, and $\theta$ is the angle made by the line of sight of telescope 23 and the known reference position line as illustrated.

$\beta$ can be determined by the relationship, $$\beta = \sin^{-1}\left[\frac{L}{l}\sin\theta\right]$$

where $l$ as illustrated is the length of radial tracking arm 11 and L is the distance from north seeking device 19 to the vertex of angle $\theta$.

Missile 30 has a guidance platform 32 aligned normally along missile axis 34. The object is to align platform 32 along prescribed firing axis 36. In order to align platform 32 in the firing azimuth 36, its initial position relative to north must be established. Telescope 23 is aligned relative to north to receive an autoreflected image from porro prism 38 located on platform 32. Platform 32 is then torqued through an angle $\theta$ to the firing azimuth 36 with the aid of a servo drive system (not shown) and the position is verified by telescope 23 in its optical tracking system.

FIG. 2 shows how azimuth alignment of platform 32 is verified using a constant ratio drive system radial arm tracker according to this invention. Angles $\beta, \alpha$, and $\theta$ correspond to the angles used in FIG. 1. Missile firing azimuth 36 is referenced to the output of north seeking device 19 through the radial arm tracker. After establishing a true north direction with the north seeking device 19, telescope 23, which is mounted on the free end of radial arm 11, is aligned to permit autoreflection with porro prism 38 located on the missile guidance platform 32. Radial arm tracker 10 (FIG. 1) is located outside missile 30 at a specified distance (L) from the guidance platform 32. Guidance platform 32 (which is now referenced to the north seeking device through the radial arm tracker (FIG. 1) and peripheral servo drives (not shown)) is torqued through angle $\theta$ to the required firing azimuth 36. As radial arm 11 is moved about encoder rotor 13 axis, telescope 23 will autoreflect from porro prism 38 for all positions of guidance platform 32 within the required operating range. Angle $\alpha$ may be recorded directly from encoder 15. Angle $\beta$ can then be solved by a guidance computer using the relationship $$\beta = \sin^{-1}\left[\frac{L}{l}\sin\theta\right]$$

for any values of $\theta$ of interest.

We claim:

1. A radial arm tracker for aligning a platform of a missile; said radial arm tracker comprising an encoder that has a rotor and a stator, a radial arm having one end connected to said rotor and an opposite end with a telescope pivotally mounted thereon, and a constant ratio drive system interconnecting said telescope and said stator of said encoder for pivoting said telescope relative to said encoder stator as said arm is rotated relative to said stator.

2. A radial arm tracker as set forth in claim 1, wherein said constant ratio drive system consists of a pulley integrally connected to said stator, a pulley privotably mounting said telescope on said radial arm for rotating said telescope, and a belt drive between said pulleys to cause said telescope to be rotated at a constant relative rate to said pulleys as said radial arm is pivoted about said stator.

* * * * *